United States Patent
Kim et al.

(10) Patent No.: US 9,395,472 B2
(45) Date of Patent: Jul. 19, 2016

(54) PRISM SHEET MEMBER AND MULTIVISION DISPLAY APPARATUS HAVING THE SAME

(71) Applicant: SAMSUNG ELECTRONICS CO., LTD., Suwon-si (KR)

(72) Inventors: Seung-min Kim, Yongin-si (KR); Tae-jun Ko, Suwon-si (KR); Hyung-ki Kim, Seoul (KR); Jeong-shan Na, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 14/177,850

(22) Filed: Feb. 11, 2014

(65) Prior Publication Data

US 2015/0009587 A1 Jan. 8, 2015

(30) Foreign Application Priority Data

Jul. 8, 2013 (KR) .................... 10-2013-0079511
Jan. 9, 2014 (KR) .................... 10-2014-0002875

(51) Int. Cl.
| | |
|---|---|
| *G02B 1/00* | (2006.01) |
| *G02B 5/04* | (2006.01) |
| *G02F 1/1333* | (2006.01) |
| *G09F 9/302* | (2006.01) |
| *G09G 3/20* | (2006.01) |

(52) U.S. Cl.
CPC ............ *G02B 5/045* (2013.01); *G02F 1/13336* (2013.01); *G09F 9/3026* (2013.01); *G09G 3/20* (2013.01); *G09G 2300/026* (2013.01)

(58) Field of Classification Search
CPC .... G02B 3/08; G02B 27/1066; G02B 26/123; G02B 26/126; G02B 5/04; G02B 27/0006; G03F 7/7015; G03F 7/70825; G03F 7/70933
USPC ............ 345/1.1–1.3, 690–684; 359/619, 629, 359/630, 837
See application file for complete search history.

(56) References Cited

U.S. PATENT DOCUMENTS

| | | | |
|---|---|---|---|
| 6,927,908 B2 | 8/2005 | Stark | |
| 8,368,729 B2 * | 2/2013 | Watanabe | ................ G02B 3/08 345/1.3 |
| 2003/0231144 A1 | 12/2003 | Cho et al. | |

(Continued)

FOREIGN PATENT DOCUMENTS

| | | |
|---|---|---|
| JP | 2009-162999 A | 7/2009 |
| KR | 20-0219413 Y1 | 4/2001 |

(Continued)

OTHER PUBLICATIONS

Search Report dated Apr. 25, 2014, issued by the International Searching Authority in counterpart International Application No. PCT/KR2014/000366.

(Continued)

*Primary Examiner* — Euncha Cherry
(74) *Attorney, Agent, or Firm* — Sughrue Mion, PLLC

(57) ABSTRACT

A prism sheet member and a multivision display apparatus having the same are provided. The prism sheet member includes an insertion portion configured to be inserted into a boundary gap between two display panels; and a first extension portion configured to extend from the insertion portion to cover a part of the non-display portion of the corresponding display panel of the two display panels.

20 Claims, 8 Drawing Sheets

(56) References Cited

U.S. PATENT DOCUMENTS

| | | |
|---|---|---|
| 2010/0259566 A1 | 10/2010 | Watanabe |
| 2011/0080665 A1 | 4/2011 | Myers et al. |
| 2011/0128208 A1 | 6/2011 | Choi |
| 2011/0215990 A1 | 9/2011 | Liesenberg |

FOREIGN PATENT DOCUMENTS

| | | |
|---|---|---|
| KR | 10-2004-0050433 A | 6/2004 |
| KR | 10-2009-0089727 A | 8/2009 |
| KR | 10-2010-0000116 A | 1/2010 |
| KR | 10-2011-0100605 A | 9/2011 |
| WO | 2012/035988 A1 | 3/2012 |

OTHER PUBLICATIONS

Written Opinion dated Apr. 25, 2014, issued by the International Searching Authority in counterpart International Application No. PCT/KR2014/000366.

Database WPI, XP002735644, Aug. 24 2009, 2 pages total, Thomson Scientific, London, GB.

Communication dated Dec. 21, 2014 issued by Korean Intellectual Property Office in counterpart Korean Application No. 10-2014-0002875.

Communication dated Feb. 19, 2015 issued by European Patent Office in counterpart European Patent Application No. 14153682.1.

* cited by examiner

PRISM SHEET MEMBER AND MULTIVISION DISPLAY APPARATUS HAVING THE SAME

PRIORITY

This application claims priority from Korean Patent Application No. 10-2013-0079511 filed on Jul. 8, 2013, and Korean Patent Application No. 10-2014-0002875 filed on Jan. 9, 2014, in the Korean Intellectual Property Office, the disclosure of which is incorporated herein by reference, in its entirety.

BACKGROUND

1. Field

The exemplary embodiments relate to a prism sheet member and a multivision display apparatus having the same. More particularly, the exemplary embodiments relate to a prism sheet member which can implement a large-scale screen by using a plurality of display panels and a multivision display apparatus having the same.

2. Description of the Related Art

A multivision display apparatus is an apparatus that implements one large-scale screen using a plurality of display panels, and is often called a video wall. The multivision display apparatus has appeared to satisfy demand for a large-scale screen of 100 inches or more, and is mainly used to simultaneously provide a large-scale image to many persons in a wide place, such as an exhibition hall, a seminar room, or a sports stadium.

In a multivision display apparatus, non-display lines where an image is not displayed may exist along boundary gaps between display panels, and such non-display lines are formed by non-display portions that exist on border regions of the display panels.

Schemes for lowering visibility of non-display lines through attachment of prisms or lenses to boundary regions between unit display panels have been introduced.

However, such schemes in the related art experience the problem that prism or lens attachment work is not easy; the prisms or lenses are visually recognized by viewers, and a displayed image is excessively distorted due to the prisms or lenses.

SUMMARY

The exemplary embodiments have been made to address at least the above problems and/or disadvantages and to provide at least the advantages described below. Accordingly, an aspect of the exemplary embodiments provide schemes for making non-display lines of a multivision display apparatus unrecognizable without having the accompanying above-described problems.

According to one aspect of the exemplary embodiments, a prism sheet member includes an insertion portion configured to be inserted into a boundary gap between two display panels; and a first extension portion configured to extend from the insertion portion to cover a part of a non-display portion of a corresponding display panel of the two display panels. The first extension portion may extend in parallel to a screen of the corresponding display panel.

The insertion portion may extend in a vertical direction with respect to the first extension portion.

The prism sheet member may further include a second extension portion configured to extend from the first extension portion toward the screen of the corresponding display panel.

An outer end of the second extension portion may come in contact with the screen of the corresponding display panel.

Each of the display panels may have four edge surfaces, and the first extension portion may cover the non-display portion of the corresponding display panel that extends along any one of the four edge surfaces of the corresponding display panel.

The prism sheet member may further include an air gap between the first extension portion and a portion of the corresponding display panel.

The prism sheet member may further include a second extension portion configured to extend from the first extension portion toward the screen of the corresponding display panel.

The first extension portion may further extend to correspond to a shape of a screen of the corresponding display panel.

An aspect of an exemplary embodiment may provide a multivision display apparatus the multivision display panel including: a plurality of display panels configured to be arranged to display one large-scale screen, each of the plurality of display panels including a display portion and a non-display portion which surrounds the display portion; and a prism sheet unit configured to have a plurality of prism sheet members which are arranged on the plurality of display panels to hide non-display lines formed by the non-display portions of the display panels along the boundary gaps between the display panels.

Each of the plurality of prism sheet members may extend along any one of the boundary gaps.

Each of the plurality of display panels may be a flat display panel or a curved display panel, and the first extension portion and the second display portion of each of the plurality of prism sheet members may be formed to correspond to the shape of the corresponding display panel.

BRIEF DESCRIPTION OF THE DRAWINGS

The above and other aspects, features and advantages of the exemplary embodiments will be more apparent from the following detailed description when taken in conjunction with the accompanying drawings, in which.

DETAILED DESCRIPTION OF THE EXEMPLARY EMBODIMENTS

Hereinafter, the exemplary embodiments are described in detail with reference to the accompanying drawings.

Figure 1:
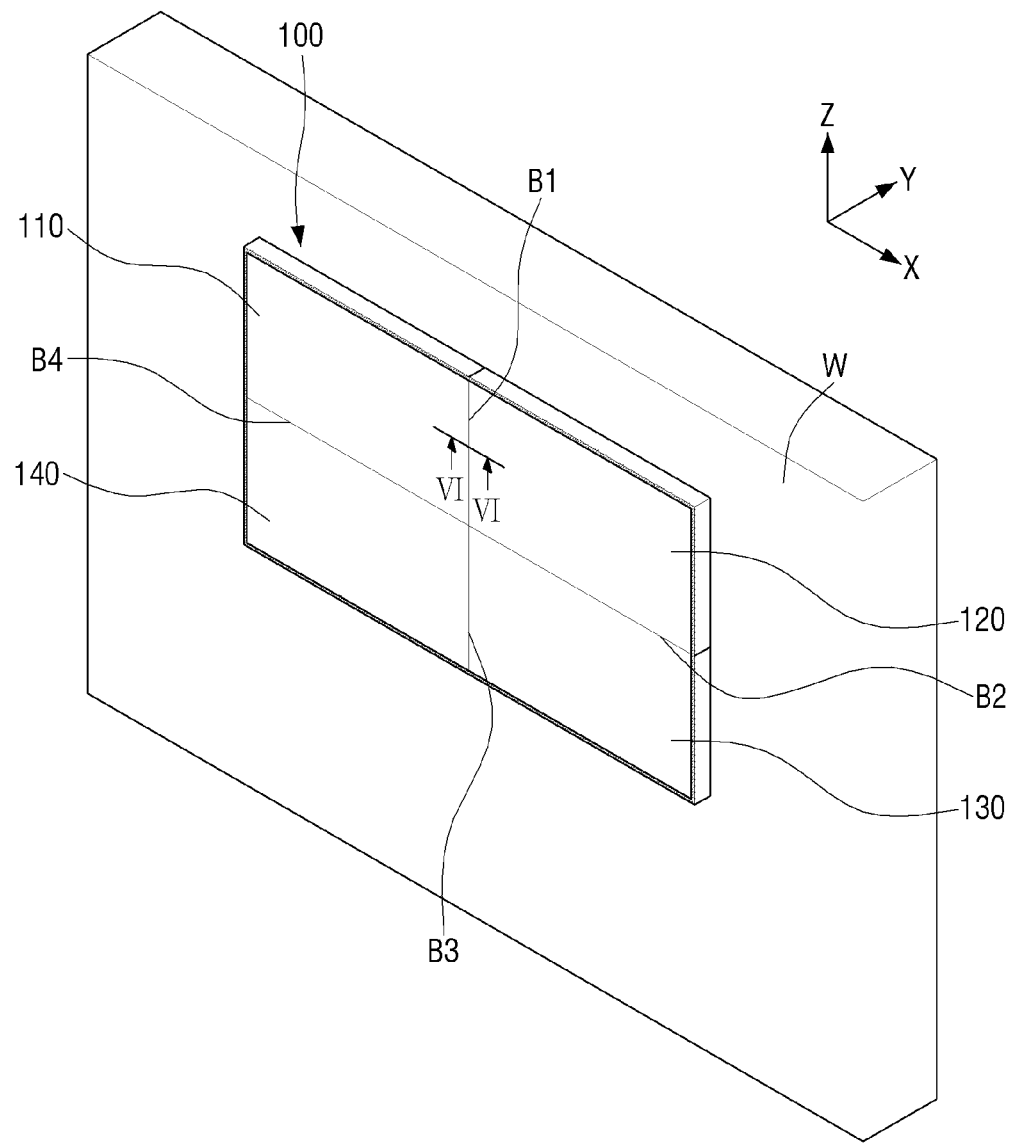
FIG. 1 is a perspective view illustrating a multivision display apparatus attached to a wall surface, according to an exemplary embodiment.

FIG. 1 is a perspective view which illustrates a multivision display apparatus attached to a wall surface, according to an exemplary embodiment.

Referring to FIG. 1, a multivision display apparatus 100 according to an exemplary embodiment includes a plurality of display panels 110, 120, 130 and 140 regularly arranged in the form of a matrix, and implements a large-scale screen (e.g., 100 inches or more) through a combination of individual screens of the plurality of display panels 110, 120, 130 and 140.

The multivision display apparatus 100 is mainly used in a wide place in which a large-scale screen is required, such as an exhibition hall, a seminar room, or a sports stadium, and it is common that the multivision display apparatus 100 be installed on a wall surface W, provided in the wide place.

In this exemplary embodiment, the multivision display apparatus 100 includes four unit display panels 110, 120, 130 and 140 which are arranged in two rows and two columns. That is, the multivision display apparatus 100 has a 2×2 arrangement. In alternative embodiments, the multivision display apparatus 100 may have a 3×3 arrangement, a 4×4 arrangement, or a 5×5 arrangement, which uses a larger number of display panels to provide a larger-scale screen.

For convenience in explanation, the display panels are called a first display panel 110, a second display panel 120, a third display panel 130 and a fourth display panel 140.

Boundary gaps B1, B2, B3 and B4 exist among the four display panels 110, 120, 130 and 140. Specifically, a first boundary gap B1 exists between the first and second display panels 110 and 120, and a second boundary gap B2 exists between the second and third display panels 120 and 130. Further, a third boundary gap B3 exists between the third and fourth display panels 130 and 140, and a fourth boundary gap B4 exists between the fourth and first display panels 140 and 110.

The four display panels 110, 120, 130 and 140 have the same structure and the same size. Accordingly, the first display panel 110 will be described as a representative display panel.

Figure 2:
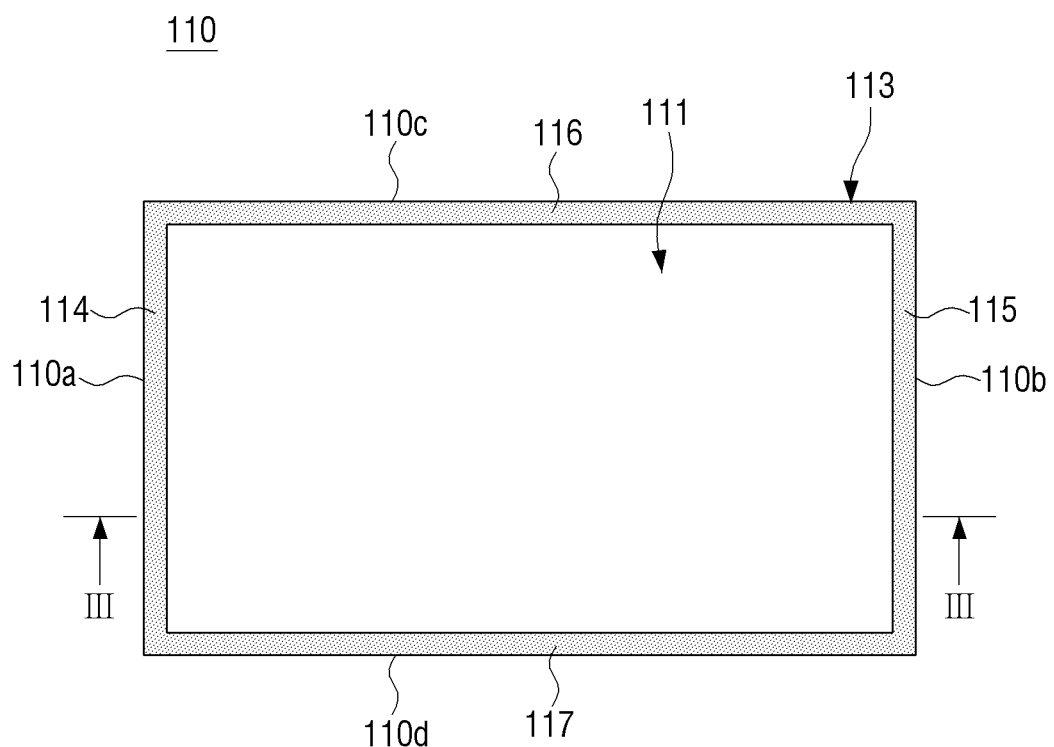
FIG. 2 is a plan view of a display panel provided in the multivision display apparatus illustrated in FIG. 1.
Figure 3:
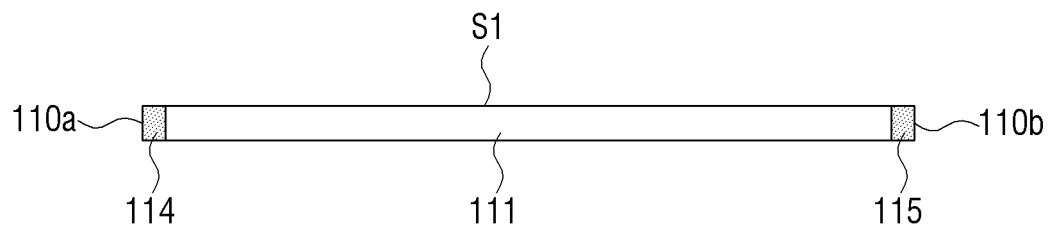
FIG. 3 is a cross-sectional view cut along line III-III of FIG. 2.

FIG. 2 is a plan view of a display panel provided in the multivision display apparatus illustrated in FIG. 1, and FIG. 3 is a cross-sectional view cut along line III-III of FIG. 2.

Referring to FIGS. 2 and 3, the display panel 110 is a kind of flat display panel. In this exemplary embodiment, the display panel 110 is provided as a liquid crystal display (LCD) panel. As an alternative, the display panel 110 may be an organic light emitting display (OLED) panel or a plasma display panel (PDP).

The display panel 110 includes a display portion 111 and a non-display portion 113 surrounding the display portion 111. The display portion 111 indicates a region in which a screen S1 is provided, and may be called an "active region." Further, the non-display portion 113 indicates a region in which the screen S is not provided, and may be called a "bezel region."

Although it is ideal that the non-display portion 113 does not exist in the display panel 110, the non-display portion 113 essentially exists in the display panel 110 due to a black matrix that exists inside the display panel 110 or a housing member (not illustrated) that is used to produce the display panel 110 as one module.

In this exemplary embodiment, the display panel 110 is in the shape of a thin rectangular plate having four edge surfaces 110a, 110b, 110c and 110d, and the non-display portion 113 includes four portions 114, 115, 116 and 117 which extend along the four edge surfaces 110a, 110b, 110c and 110d.

Figure 4:
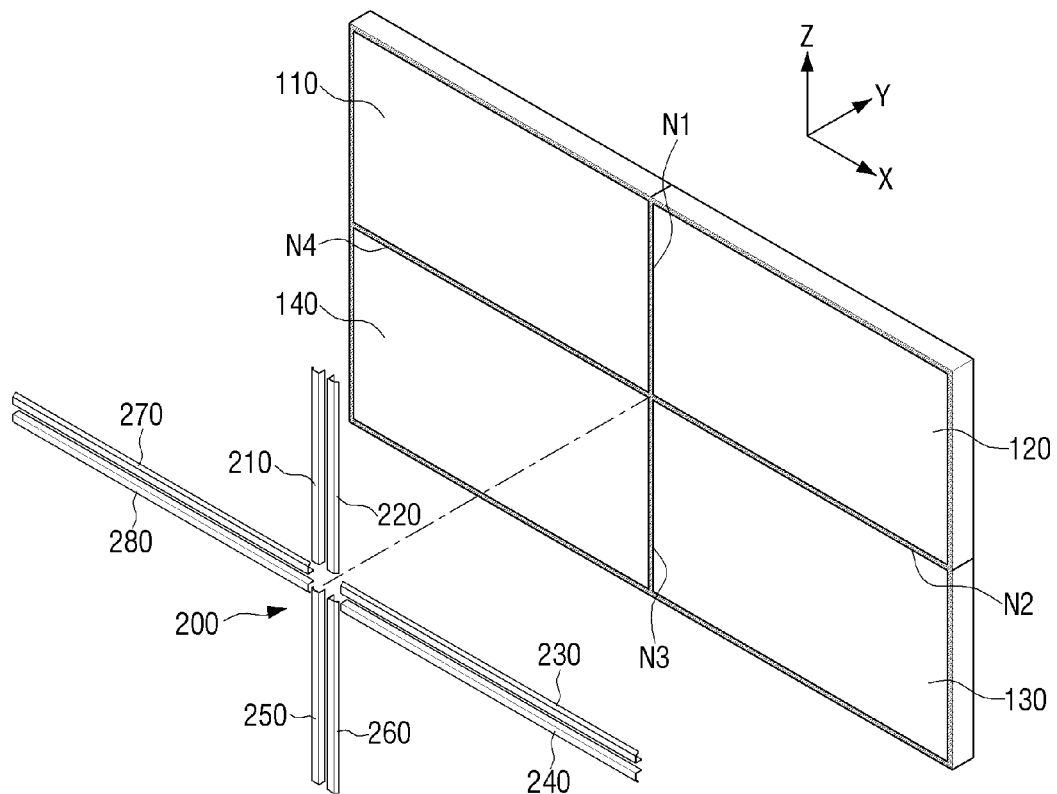
FIG. 4 is a partially exploded perspective view of the multivision display apparatus illustrated in FIG. 1.

FIG. 4 is a partially exploded perspective view of the multivision display apparatus illustrated in FIG. 1.

Referring to FIG. 4, four non-display lines N1, N2, N3 and N4 may be visually recognized along the boundary gaps B1, B2, B3 and B4 (see FIG. 1) among the four unit display panels 110, 120, 130 and 140. For convenience in explanation, the non-display line N1 that is formed along the first boundary gap B1 is called a first non-display line, and the non-display line N2 that is formed along the second boundary gap B2 is called a second non-display line. Further, the non-display line N3 that is formed along the third boundary gap B3 is called a third non-display line, and the non-display line N4 that is formed along the fourth boundary gap B4 is called a fourth non-display line.

The respective non-display lines N1, N2, N3 and N4 are formed by the non-display portions of the display panels that are arranged on both sides of the boundary gaps B1, B2, B3 and B4. For example, the first non-display line N1 is composed of the non-display portion 115 (see FIG. 2) of the first display panel 110 that is arranged on the left side of the first boundary gap B1 and the non-display portion 123 (see FIG. 6) of the second display panel 120 that is arranged on the right side of the second boundary gap B2.

Since the non-display lines N1, N2, N3 and N4 correspond to the regions in which an image is not displayed, they lower the continuity of the image that is provided by the multivision display apparatus 100 to cause the quality of the image to deteriorate.

As illustrated in FIG. 4, the multivision display apparatus 100 includes a prism sheet 200 that is arranged on the display panels 110, 120, 130 and 140 to hide the non-display lines N1, N2, N3 and N4 so that the non-display lines N1, N2, N3 and N4 are not visually recognized by viewers.

In this exemplary embodiment, the prism sheet 200 includes 8 prism sheet members 210, 220, 230, 240, 250, 260, 270 and 280 in total. Two prism sheet members are arranged along the respective boundary gaps B1, B2, B3 and B4 (see FIG. 1). Specifically, the first and second prism sheet members 210 and 220 are arranged to face each other along the first boundary gap B1, and the third and fourth prism sheet members 230 and 240 are arranged to face each other along the second boundary gap B2. Further, the fifth and sixth prism sheet members 250 and 260 are arranged to face each other along the third boundary gap B3, and the seventh and eighth prism sheet members 270 and 280 are arranged to face each other along the fourth boundary gap B4.

The four prism sheet members 230, 240, 270 and 280 that extend in the horizontal direction (in the left/right direction) are formed to be somewhat longer than the other four prism sheet members 210, 220, 250 and 260 that extend in the vertical direction (in the upper/lower direction). However, the 8 prism sheet members 210, 220, 230, 240, 250, 260, 270 and 280 are different in length from each other, but have substantially the same structure.

Figure 5:
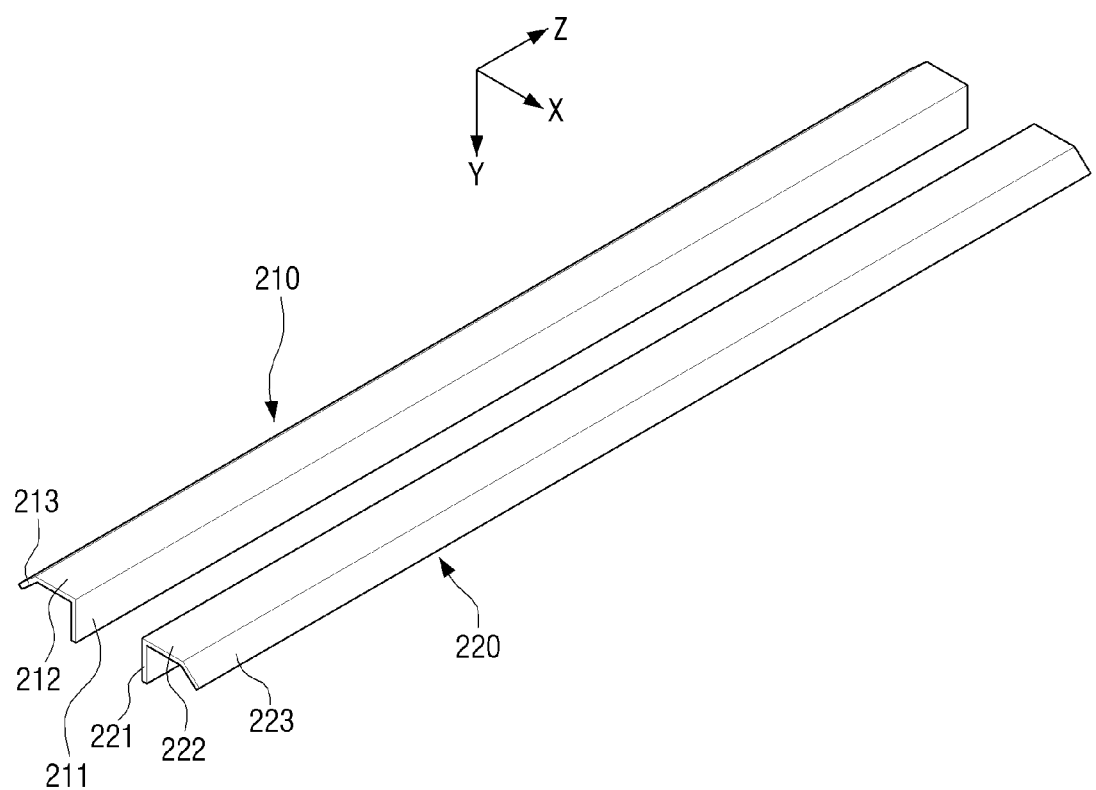
FIG. 5 is an enlarged perspective view of first and second prism sheet members of a prism sheet illustrated in FIG. 4.
Figure 6:
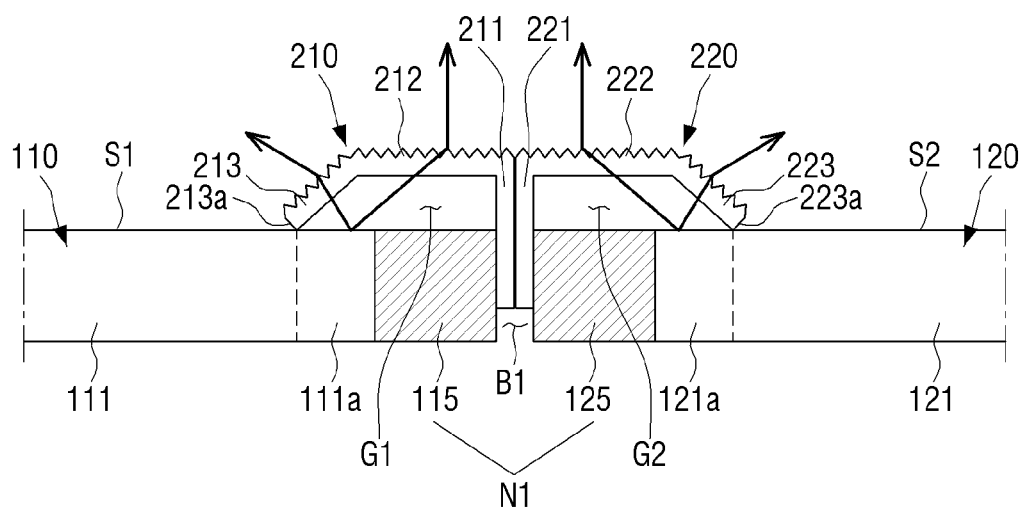
FIG. 6 is an enlarged cross-sectional view cut along line VI-VI of FIG. 1.

Accordingly, the first and second prism sheet members 210 and 220 illustrated in FIGS. 5 and 6 will be representatively described. The remaining prism sheet members 230, 240, 250, 260, 270 and 280 can be sufficiently understood from the following explanation of the first and second prism sheet members 210 and 220.

FIG. 5 is an enlarged perspective view of first and second prism sheet members of a prism sheet illustrated in FIG. 4, and FIG. 6 is an enlarged cross-sectional view cut along lint VI-VI of FIG. 1.

Referring to FIGS. 5 and 6, the first and second prism sheet members 210 and 220 are made of a transparent material, and have properties that they transmit and refract light. The first and second prism sheet members 210 and 220 extend long along the boundary gap B1 between the first and second display panels 110 and 120.

The first prism sheet member 210 includes an insertion portion 211, a first extension portion 212, and a second extension portion 213, and in the same manner, the second prism sheet member 220 includes an insertion portion 221, a first extension portion 222, and a second extension portion 223.

The insertion portions 211 and 221 of the first and second prism sheet members 210 and 220 are in the shape of a substantially long rectangular film. The insertion portions 211 and 221 are inserted into the boundary gap B1 in the vertical direction (Y direction) to screens S1 and S2, and thus the first and second prism sheet members 210 and 220 are mounted on the multivision display apparatus 100 to face each other.

As described above, the prism sheet members 210 and 220 are mounted on the multivision display apparatus 100 through simple insertion of the insertion portions 211 and 221 into the boundary gap B1 without any help from an attachment means, and thus the mount work of the prism sheet members 210 and 220 can be performed quite easily.

The first extension portions 212 and 222 of the first and second prism sheet members 210 and 220 are in a substantially long rectangular film shape, extend from the insertion portions 211 and 221 in the vertical direction with respect to the insertion portions 211 and 221, and are arranged in parallel to the screens S1 and S2.

The first extension portion 212 of the first prism sheet member 210 is arranged to cover a part 115 of the non-display portion 113 of the corresponding first display panel 110. On the other hand, the first extension portion 222 of the second prism sheet member 220 is arranged to cover a part 125 of the non-display portion (not illustrated) of the corresponding second display panel 120. Actually, the first extension portions 212 and 222 of the prism sheet members 210 and 220 partially cover the display portions 111 and 121 of the display panels 110 and 120.

The second extension portions 213 and 223 of the first and second prism sheet members 210 and 220 are in a substantially long rectangular film shape, and extend from the first extension portions 212 and 222 to be inclined at an obtuse angle with respect to the first extension portions 212 and 222. Outer ends 213a and 223a of the second extension portions 213 and 223 come in contact with the screens S1 and S2 of the display panels 110 and 120.

As illustrated in FIG. 6, the second extension portion 213 of the first prism sheet member 210 covers a portion 111a of the display portion 111 of the first display panel 110 together with the first extension portion 212 of the first prism sheet member 210, and the second extension portion 223 of the second prism sheet member 220 covers a portion 121a of the display portion 121 of the second display panel 120, together with the first extension portion 222.

An image that is provided by the portion 111a of the display portion 111 covered by the first prism sheet member 210 is visually recognized by a viewer through the first extension portion 212 of the first prism sheet member 210 due to light refraction of the first prism sheet member 210, and an image that is provided by the portion 121a of the display portion 121 covered by the second prism sheet member 220 is visually recognized by a viewer through the first extension portion 222 of the second prism sheet member 220 due to light refraction of the second prism sheet member 210.

In this case, the first and second extension portions 212 and 222 of the first and second prism sheet members 210 and 220 are spaced a certain distance apart from the non-display portions 115 and 125 in order to provide a space where the light refraction is allowed. Hence, certain air gaps G1 and G2 are formed between the first extension portions 212 and 222 of the first and second prism sheet members 210 and 220 and the non-display portions 115 and 125, respectively.

In addition, as the second extension portions 213 and 223 of the first and second prism sheet members 210 and 220 extend from the first extension portions 212 and 222, the air gaps G1 and G2 are formed between the second extension portions 213 and 223 and the display portions 111a and 121a.

As described above, since the images are visually recognized through the first extension portions 212 and 222 of the first and second prism sheet members 210 and 220, the non-display line N1, which is composed of the non-display portions 115 and 125 covered by the first extension portions 212 and 222, is not visually recognized by the viewers. According to the same principle, the other non-display lines N2, N3, and N4 (see FIG. 4) are not visually recognized by the viewers through the operation of the other prism sheet members 230, 240, 250, 260, 270 and 280. Accordingly, the quality of the image that is provided by the multivision display apparatus 100 may be improved.

On the other hand, since the second extension portion 213 of the first prism sheet member 210 is arranged to be inclined at an obtuse angle with respect to the first extension portion 212 of the first prism sheet member 210 and has a refraction direction that is different from the refraction direction of the first extension portion 212, the image, which is provided by the portion 111a of the display portion 111 and permeates the second extension portion 213, is not visually recognized in overlay by the viewer. In the same manner, since the second extension portion 223 of the second prism sheet member 220 is arranged to be inclined at an obtuse angle with respect to the first extension portion 222 of the second prism sheet member 220 and has a refraction direction that is different from the refraction direction of the second extension portion 222, the image, which is provided by the portion 121a of the display portion 121 and permeates the second extension portion 223, is not visually recognized in overlay by the viewer.

Further, since the second extension portions 213 and 223 are provided in the first and second prism sheet members 210 and 220, other portions of the first and second prism sheet members 210 and 220, that is, the first extensions 212 and 222 and the insertion portions 211 and 221, may not be visually recognized by the viewers who view the multivision display apparatus 100 at an angle from the side surface thereof.

In addition, since the prism sheet members 210 to 280 have a relatively smaller size than the size of a prism or a lens, they may not attract the viewer's eye.

Figure 7:
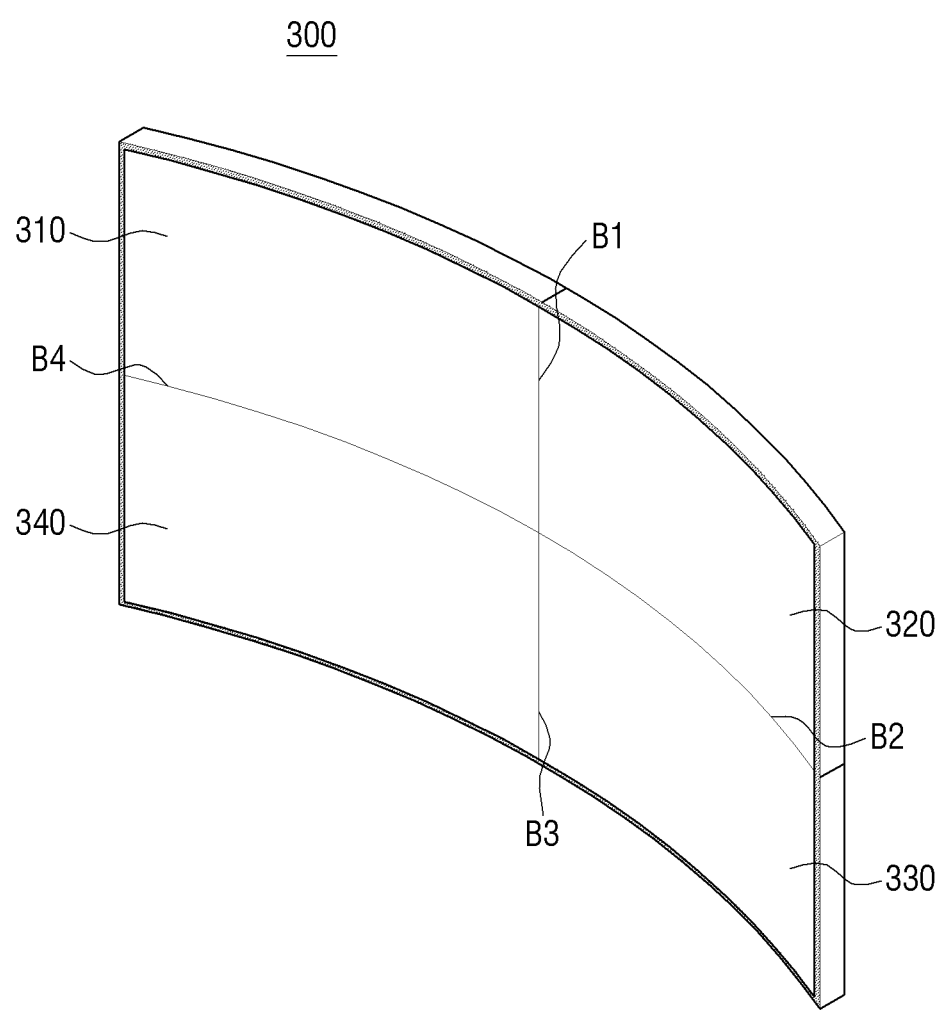
FIG. 7 is a perspective view of a multivision display apparatus according to a second exemplary embodiment.
Figure 8:
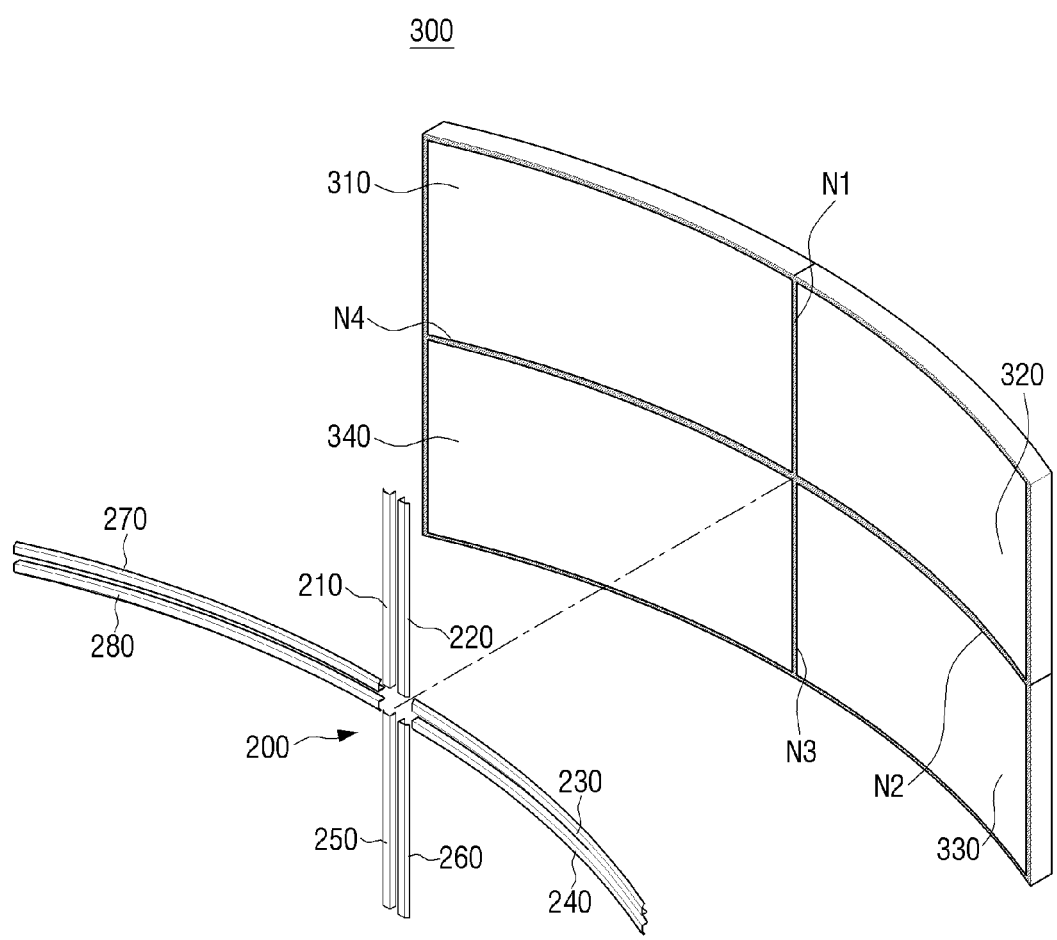
FIG. 8 is a partially exploded perspective view of the multivision display apparatus of FIG. 7.

FIG. 7 is a perspective view of a multivision display apparatus according to a second embodiment, and FIG. 8 is a partially exploded perspective view of the multivision display apparatus of FIG. 7.

Referring to FIGS. 7 and 8, in the same manner as the multivision display apparatus 100 as described above, a multivision display apparatus 300 according to the second embodiment also includes four display panels 310, 320, 330 and 340. However, the multivision display apparatus 300 is distinguishable from the above-described multivision display apparatus 100 that provides a flat screen on the point that the multivision display apparatus 300 includes the display panels 310, 320, 330 and 340 that are curved display panels and thus provides a curved screen.

As illustrated in FIG. 8, in the same manner as the above-described multivision display apparatus 100, the multivision display apparatus 300 according to the second exemplary embodiment includes the above-described prism sheet 200.

Accordingly, even in the case of the multivision display apparatus 300 according to the second embodiment, non-display lines N1, N2, N3 and N4, which are formed along boundary gaps B1, B2, B3, and B4 among the display panels 310, 320, 330 and 340, are not visually recognized by the viewers.

As an example, prison sheet members 210, 220, 230, 240, 250, 260, 270 and 280 may be made of an elastic material (e.g., polyethylene terephthalate (PET)). Accordingly, the prism sheet members 230, 240, 270 and 280 that are arranged in the horizontal direction may be appropriately transformed to match the curvature of the multivision display apparatus 300 due to their elasticity when they are mounted on the multivision display apparatus 300. Of course, the prism sheet members 230, 240, 270 and 280 may be processed to have a curvature that corresponds to the curvature of the multivision display apparatus 300 at the manufacturing stage.

As described above, the technical idea of the exemplary embodiments adopts the prism sheet including the plurality of prism sheet members so that the non-display lines are not visually recognized by the viewers, can be applied to not only a multivision display apparatus that belongs to a flat display but also a multivision display apparatus that belongs to a curved display.

That is, the first extension portions 212 and 222 and the second extension portions 213 and 223 of the aforementioned prism sheet members 230, 240, 270, and 280 may be formed to correspond to the shapes of the corresponding display panels, that is, the flat display panels 110, 120, 130, and 140 and the curved display panels 310, 320, 330, and 340.

While the present disclosure has been shown and described with reference to certain exemplary embodiments thereof, it will be understood by those skilled in the art that various changes in form and detail may be made therein without departing from the spirit and scope of the invention, as defined by the appended claims.

What is claimed is:

1. A prism sheet member comprising:
   an insertion portion which is in a shape of a sheet, configured to be inserted into a boundary gap between two display panels; and
   a first extension portion which is in the shape of a sheet, configured to extend from the insertion portion to cover a part of the non-display portion of the corresponding display panel of the two display panels.

2. The prism sheet member as claimed in claim 1, wherein the first extension portion extends in parallel to a screen of the corresponding display panel.

3. The prism sheet member as claimed in claim 1, wherein the insertion portion extends in a vertical direction with respect to the first extension portion.

4. The prism sheet member as claimed in claim 1, further comprises a second extension portion configured to extend from the first extension portion toward the screen of the corresponding display panel.

5. The prism sheet member as claimed in claim 4, wherein an outer end of the second extension portion comes in contact with the screen of the corresponding display panel.

6. The prism sheet member as claimed in claim 1, wherein each of the display panels has four edge surfaces, and the first extension portion covers the non-display portion of the corresponding display panel that extends along any one of the four edge surfaces of the corresponding display panel.

7. The prism sheet member as claimed in claim 1, further comprises an air gap between the first extension portion and a portion of the corresponding display panel.

8. The prism sheet member as claimed in claim 7, further comprises a second extension portion configured to extend from the first extension portion toward the screen of the corresponding display panel.

9. A multivision display apparatus comprising:
   a plurality of display panels configured to be arranged to display one large-scale screen, each of the plurality of display panels including a display portion and a non-display portion which surrounds the display portion; and
   a prism sheet unit configured to have a plurality of prism sheet members which are arranged on the plurality of display panels to hide non-display lines formed by the non-display portions of the display panels along the boundary gaps between the display panels, the plurality of prism sheet members being in a shape of a sheet.

10. The multivision display apparatus as claimed in claim 9, wherein each of the plurality of prism sheet members comprises:
    an insertion portion configured to be inserted into the boundary gap between the two display panels; and
    a first extension portion configured to extend from the insertion portion to cover a part of the non-display portion of the corresponding display panel of the plurality of display panels.

11. The multivision display apparatus as claimed in claim 9, wherein the first extension portion extends in parallel to a screen of the corresponding display panel.

12. The multivision display apparatus as claimed in claim 9, wherein the insertion portion extends in a vertical direction with respect to the first extension portion.

13. The multivision display apparatus as claimed in claim 9, wherein each of the prism sheet members further comprises a second extension portion configured to extend from the first extension portion toward the screen of the corresponding display panel.

14. The multivision display apparatus as claimed in claim 13, wherein an outer end of the second extension portion comes in contact with the screen of the corresponding display panel.

15. The multivision display apparatus as claimed in claim 9, wherein each of the display panels has four edge surfaces, and the first extension portion covers the non-display portion of the corresponding display panel that extends along any one of the four edge surfaces of the corresponding display panel.

16. The multivision display apparatus as claimed in claim 9, further comprises an air gap between the first extension portion and a portion of the corresponding display panel.

17. The multivision display apparatus as claimed in claim 16, further comprises a second extension portion configured to extend from the first extension portion toward the screen of the corresponding display panel.

18. The multivision display apparatus as claimed in claim 9, wherein each of the plurality of prism sheet members extends along any one of the boundary gaps.

19. The multivision display apparatus as claimed in claim 9, wherein each of the display panels is a flat display panel or a curved display panel.

20. The multivision display apparatus as claimed in claim 13, wherein each of the display panels is a flat display panel or a curved display panel, and wherein the first and second extension portions configured to correspond to the corresponding display panel.

* * * * *